United States Patent
Kudo et al.

(10) Patent No.: US 7,796,295 B2
(45) Date of Patent: Sep. 14, 2010

(54) IMAGE READER SYSTEM, IMAGE READER CONTROL METHOD, AND COMPUTER-READABLE MEDIUM

(75) Inventors: Naoko Kudo, Kanagawa (JP); Hiroyuki Asada, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 869 days.

(21) Appl. No.: 11/559,522

(22) Filed: Nov. 14, 2006

(65) Prior Publication Data

US 2007/0146808 A1    Jun. 28, 2007

(30) Foreign Application Priority Data

Dec. 26, 2005   (JP) ............................ 2005-373198

(51) Int. Cl.
*H04N 1/40* (2006.01)
(52) U.S. Cl. ...................... 358/1.9; 358/468
(58) Field of Classification Search ................ 358/1.9, 358/2.1, 453–462, 468, 538
See application file for complete search history.

(56) References Cited

U.S. PATENT DOCUMENTS

| | | | | |
|---|---|---|---|---|
| 5,075,787 A | * | 12/1991 | Shaughnessy et al. | 358/452 |
| 5,138,465 A | * | 8/1992 | Ng et al. | 358/453 |
| 6,903,838 B1 | * | 6/2005 | Hanson et al. | 358/1.15 |

FOREIGN PATENT DOCUMENTS

| | | |
|---|---|---|
| JP | 9179833 | 7/1997 |
| JP | 11134134 | 5/1999 |
| JP | 2003-011465 | 1/2003 |

* cited by examiner

*Primary Examiner*—Thomas D Lee
*Assistant Examiner*—Stephen M Brinich
(74) *Attorney, Agent, or Firm*—Gauthier & Connors LLP

(57) ABSTRACT

There is provided an image reader system including an attribute acquisition unit that acquires an attribute of an original that has been detected by an image reader unit that optically reads an image of the original, and an image output unit that outputs the attribute that has been acquired by the image reader unit and image data that are acquired by the reading of the image reader unit with the attribute and the image data being associated with each other.

6 Claims, 6 Drawing Sheets

|  | FIRST SHEET | SECOND SHEET | THIRD SHEET | FOURTH SHEET |
|---|---|---|---|---|
| FRONT SURFACE | 1 | 3 | 4 | 5 |
| BACK SURFACE | 2 |  |  | 6 |

Fig. 3

|  | FIRST PAGE | SECOND PAGE | THIRD PAGE | FOURTH PAGE | FIFTH PAGE | SIXTH PAGE |
|---|---|---|---|---|---|---|
| ATTRIBUTE | FRONT SURFACE OF FIRST PAGE | BACK SURFACE OF FIRST PAGE | FRONT SURFACE OF SECOND PAGE | FRONT SURFACE OF THIRD PAGE | FRONT SURFACE OF FOURTH PAGE | BACK SURFACE OF FOURTH PAGE |
| PAGE IMAGE | 1 | 2 | 3 | 4 | 5 | 6 |

Fig. 4

|  | FIRST SHEET | SECOND SHEET | THIRD SHEET |
|---|---|---|---|
| FRONT SURFACE | 1 | 3 | 5 |
| BACK SURFACE | 2 | 4 | 6 |

RELATED ART

Fig. 5

IMAGE READER SYSTEM, IMAGE READER CONTROL METHOD, AND COMPUTER-READABLE MEDIUM

BACKGROUND

Priority Information

This application claims priority to Japanese Patent Application No. 2005-373198, filed on Dec. 26, 2005.

1. Technical Field

The present invention relates to a system and a method for reading an image on an original to produce image data.

2. Related Art

Statements of delivery, order forms, and other documents, which have been received in the form of paper sheets, have more and more often been saved in the form of electronic data after being read with a scanner, in view that such documents require a lot of space when saved in the form of paper sheets. After the enactment of the Sarbanes-Oxley Act, IT Systems has been required to save the existing paper documentations to the electronic data documents. The tendency of saving documents in the form of electronic data is expected to become further stronger.

Documents saved as electronic image data are sometimes printed again for use. In such cases, it is generally desirable that paper documents produced by the printing resemble the originals as closely as possible. For example, if an original order form is printed as a double-sided (duplex) printing, a print result of the double-sided printing is desirably obtained upon reprinting of the image data having been acquired by reading the original order form. Moreover, upon printing of an image file having been acquired by reading a pad of originals in which double-sided printed sheets and single-sided (simplex) printed sheets are intermixed is printed, the pages originally printed by the double-sided printing are desirably output in the form of the double-sided print and the pages originally printed by the single-sided print are desirably output in the form of the single-sided print.

Moreover, some printing apparatus include the function of automatically expanding or reducing an image to be printed when a user expressly specifies a sheet size. When such a function is selected, image data are sometimes printed in a size different from that of the original.

Moreover, even if the same original has been read, the image quality of the image data to be generated changes considerably between the case where a scanner executes image quality adjustment processing such as background suppression processing and the case where the scanner does not execute any image quality adjustment processing. Consequently, for example, when optical character recognition (OCR) processing is performed on the image data generated by the scanner, if the image data that have been subjected to the background suppression by the scanner are input into an OCR that, for example, premises an image that has not been subjected to background suppression (and consequently the OCR performs the background suppression), the OCR further performs the background suppression, and not only is the processing useless but also there is also the possibility of exerting a harmful influence on recognition accuracy, because the image quality has been changed by the double OCR processing.

SUMMARY

According to an aspect of the invention, there is provided an image reader system including an attribute acquisition unit that acquires an original attribute of an original that has been detected by an image reader unit that optically reads an image of the original, and an image output unit that outputs the original attribute that has been acquired by the image reader unit and image data that are acquired by the reading of the image reader unit with the attribute and the image data being associated with each other.

BRIEF DESCRIPTION OF THE DRAWINGS

An exemplary embodiment of the present invention will be described in detail by reference to the following figures, wherein:

FIG. 3 is a diagram illustrating originals in which double-sided originals and single-sided originals are intermixed;

FIG. 4 is a diagram schematically showing image data including an attribute that is acquired at the time of reading the originals of FIG. 3;

FIG. 5 is a diagram for explaining a page arrangement acquired at the time of printing the reading result as in FIG. 3 with a conventional apparatus that does not save attributes in association with image data;

DETAILED DESCRIPTION

Figure 1:
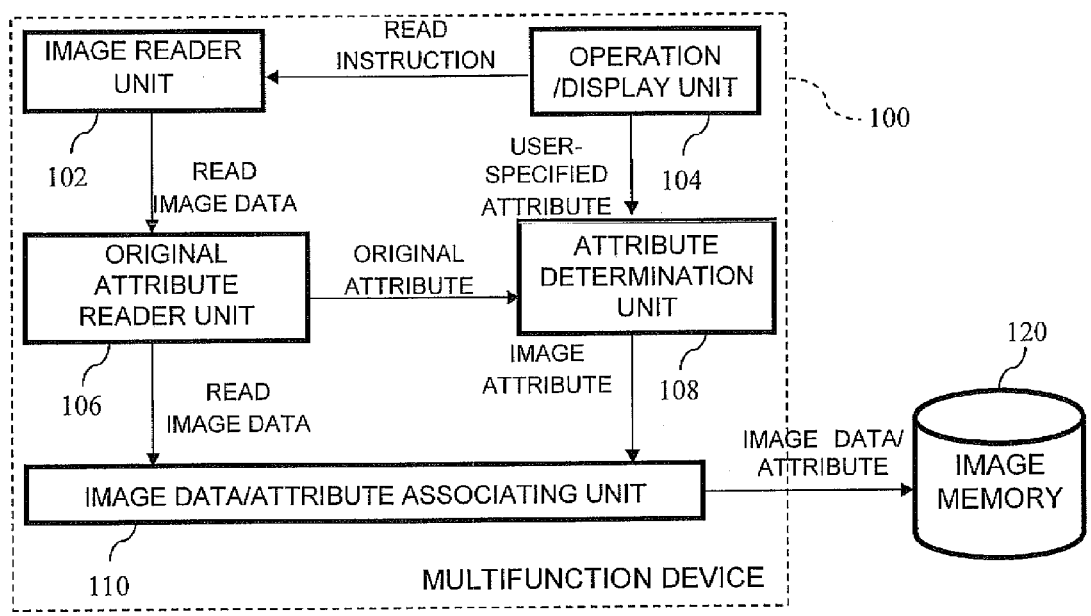
FIG. 1 is a block diagram showing the functional configuration of a multifunction device of the exemplary embodiment.

First, an example configuration of a multifunction device 100 installing the system of the present exemplary embodiment is described with reference to FIG. 1.

In the multifunction device 100, an image reader unit 102 is a device that optically reads an image provided on the surface of an original.

An operation/display unit 104 is a user interface mechanism of the multifunction device 100. The operation/display unit 104 displays an operation screen and various information screens of the multifunction device 100, and acquires an instruction and a parameter that a user inputs in response to the information displayed on the screen. The operation/display unit 104 is provided with, for example, a liquid crystal touch panel, a program to perform display and input-acceptance processing by means of the liquid crystal touch panel, buttons such as a start button and numeric keys, and the like.

As is well known, the multifunction device 100 can receive inputs of various attributes (parameters) pertaining to read processing from a user at the time of receiving an instruction of image reading. For example, it is supposed that the read attribute specified by the user is referred to as a "user-specified attribute." Examples of user-specified attributes include the sheet size of the original to be read (original size), a scanning classification of either single-sided scanning or double-sided scanning, the duplex mode (short-side/long-side binding) of originals in the case of the double-sided scanning, scanning resolution, a distinction of whether or not a scanning result is subjected to background suppression, a sharpness value, a distinction of whether or not show-through effect correction processing is performed in scanning, and the like. The user-specified attributes are input from the operation/display unit 104.

An original attribute reader unit 106 acquires from the image reader 102 the attribute of an original (hereinafter referred to as an "original attribute"), which is known as a result of an original scanning operation performed by the image reader unit 102. Examples of original attributes include a distinction of whether an original is color or monochrome, an original size, a classification of a double-sided original/a single-sided original, a classification of the front surface/the back surface of a double-sided original, the information indicating the sheet number of an original among multiple sheets of originals, and the like. The original attribute reader unit 106 may detect the original attributes from the read image data output from the image reader unit 102.

The image reader unit 102 executes the original scanning in accordance with a user-specified attribute input from the operation/display unit 104. Moreover, there is a case where the scanning operation of the image reader unit 102 is controlled in accordance with the original attribute read by the original attribute reader unit 106. Moreover, the multifunction device 100 performs various kinds of image processing on the raw read image data output by the image reader unit 102, and the image processing is controlled in accordance with a user-specified attribute and an original attribute.

An attribute determination unit 108 checks for the existence of a conflict between the user-specified attribute input from the operation/display unit 104 and the original attribute acquired by the original attribute reader unit 106. For example, because the original size is included in both the user-specified attribute and the original attribute, existence of a conflict is possible. When the check reveals that an attribute item has a conflict, the attribute determination unit 108 selects either of the user-specified attribute and the original attribute in accordance with a rule prescribing which is assigned priority (the rule is prescribed to each attribute item). The image reader unit 102 or the image processing of read image data is sometimes controlled by reference to the attribute item selected as the result of the conflict judgment.

An image data/attribute associating unit 110 associates the read image data that has been subjected to image processing in accordance with the attributes that have been finally determined by the attribute determination unit 108, with the attribute data that have been judged by attribute determination unit 108, and registers the associated read image data and the attribute data in a memory in the multifunction device 100 or in an image memory 120 provided on a network.

Figure 2:
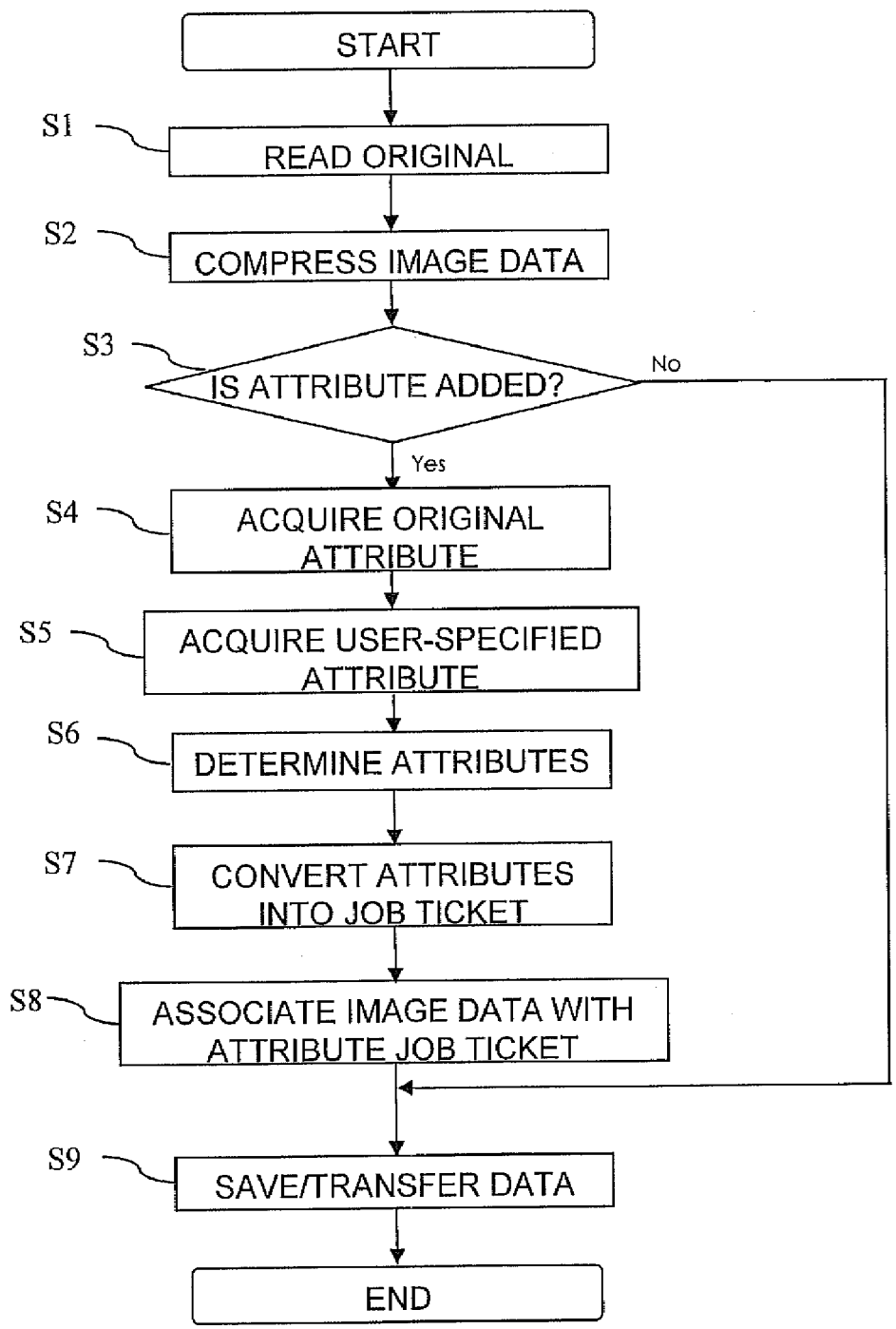
FIG. 2 is a flow chart showing processing executed by the multifunction device.

FIG. 2 shows the processing executed by the multifunction device 100 of the present exemplary embodiment. In the processing, first, the multifunction device 100 reads an original by means of the image reader unit 102 in response to a user's instruction (Step S1). A user-specified attribute has already been acquired at the time of the instruction, and an original attribute is acquired at the time of the reading. The multifunction device 100 subjects the read image data to predetermined image processing determined by the user-specified attribute or the original attribute (such as background suppression, tone correction for a color original, and image processing for monochrome original), and subjects the acquired image data to image compression (Step S2). In the image compression, compression is performed by a method suitable to each color mode (color/monochrome classification) or each original classification. For example, in the case of a full-color original or a gray scale original, Joint Photographic Experts Group (JPEG) compression is performed. In the case of a monochrome two-tone original, Modified Modified READ (MMR) compression is performed. The original classification such as color/gray scale/monochrome binary can be judged from the analysis of read image data. The image data compressed in such a way are stored in a file of a file format such as Portable Document Format (PDF) or Tagged Image File Format (TIFF).

Next, the multifunction device 100 judges whether or not an attribute addition mode has been selected (Step S3). The attribute addition mode is a mode to save the file of the read image data with the attribute data associated with the file. The multifunction device 100 is equipped with a user interface to specify whether or not the attribute addition mode is selected, and a user may specify the selection/non-selection by means of the user interface.

When the attribute addition mode is selected, the attribute determination unit 108 acquires the original attribute and the user-specified attribute (Steps S4, S5), and performs conflict judgment of the attributes to determine the value of each attribute item (Step S6). The attribute determination unit 108 then converts into a job ticket the pair consisting of the determined values of the attribute items (Step S7). The job ticket is a kind of a file describing a print attribute. However, the job ticket is only an example. The data generated in Step S7 may be a file or data in another format describing the print attribute. Furthermore, there may be adopted a file or data of a data format prescribing a processing attribute not only of printing but also of the whole job. In any event, any data can be adopted, so long as the data have a format that can be interpreted by an apparatus at the subsequent stage supposed to be an apparatus that processes the file of saved image data (e.g. a printer or OCR software).

In addition, in Step S6, the value of the attribute may be determined at each page from which the value is read. For example, an attribute pertaining to whether the read original is the front surface or the back surface of a sheet may be determined for each page. Moreover, there may also be considered an original whose front surface is printed in color and whose back surface is printed in monochrome. In such an original, the classification of color/monochrome changes at each page. The original attribute frequently has different values in each page of the original. In contrast, the user-specified attribute is frequently common to all pages in one job (the originals set in an ADF), and the attribute may be given to each page even if the attribute is such a common attribute (as a matter of course, the common attribute and the attribute that varies from page to page may be separately described in a job ticket or other attribute data).

Then, the image data/attribute associating unit 110 associates the file of the image data that has been produced in Step S2 with the job ticket that has been produced in Step S7 (Step S8), and saves the file and the associated job ticket in a local memory of the multifunction device 100 or transfers the file and the associated job ticket to the image memory 120 on the network to register the same therein (Step S9).

Here, association of the image data with the job ticket (processing attribute data) may be realized by, for example, giving both of them mutual identification information, or giving either of them the identification information of the other. Here, it is sufficient for the identification information of the image data and the job ticket to be unique in a system composed of the multifunction device 100, and a printing apparatus and another apparatus using the image data produced by the multifunction device 100. For example, a combination of the identification number of the multifunction device 100 and a unique number generated in the multifunction device 100 may be used as the identification information of image data and the like.

Moreover, for example, a database indicating the correspondence relation between image data and a job ticket may be built in the multifunction device 100 or in the image memory 120 to register into the database the correspondence relation between the generated image data and the job ticket. In this case, for example, the identification information of the image data and the identification information of the job ticket corresponding to the image data are registered in the database. An apparatus on the side of using the image data or the job ticket may specify the job ticket or the image data that corresponds to the identification information by means of accessing the database.

Moreover, as an example of the "association," image data and a job ticket may be transmitted to the other party side simultaneously or in sequence in a single communication session.

Moreover, the data of processing attribute may be incorporated as metadata or attribute data into the file of image data rather than into the job ticket. The incorporated data are also an example of the "association."

In addition, when it is judged that the attribute addition mode is not selected in Step S3, the multifunction device 100 simply saves the file of the image data generated in Step S2 into the local memory or the image memory 120.

An apparatus on the side of using the image data may correctly acquire the image data and the job ticket (processing attribute data) corresponding to the image data to thereby process the image data in accordance with the job ticket using the association mentioned above.

Here, as an attribute that the copier 100 can acquire, an example of processing control using the classification of double-sided originals and single-sided originals is described with reference to FIGS. 3-5.

For example, it is supposed that four color originals shown in FIG. 3 exist as originals. The first sheet of the originals is a sheet subjected to double-sided printing; the second and the third sheets are subjected to single-sided printing; and the fourth sheet is subjected to single-sided printing. The originals are read by the copier 100 in a duplex mode. Hereupon, the copier 100 is supposed to have a blank paper detection function. The blank paper detection function is a function of, for example, acquiring the image density (the average value) of an image on one surface of a read sheet to judge that the surface is a blank paper when the image density is a predetermined threshold value or less. Alternatively, the blank paper detection function is a function of acquiring the image density of each portion of one surface of a sheet to judge the surface to be a blank paper when all of the image densities of the respective portions are the predetermined threshold value or less. Then, the image data on the surface that is judged to be a blank paper are deleted. This is an outline of the general blank paper detection function.

When the originals shown in FIG. 3 are scanned by the copier 100 having such a blank paper detection function, six pages of page images may be acquired as shown in FIG. 4, because the back surfaces of the two sheets of the four sheets are blank. Then, attributes such as "the front surface of a first sheet," "the back surface of the first sheet," "the front surface of a second sheet," and the like are associated with the respective page images. The attributes are information capable of being acquired by the read operations. Because the back surface of the second sheet is a blank paper, there is no page image having an attribute of "the back surface of the second sheet." The multifunction device 100 of the present exemplary embodiment associates an image file including multiple page images with the attribute data indicating the sheet number of each page image and whether the page image is the front surface or the back surface of the sheet, and outputs the associated image file and the attribute data.

The printing apparatus that has received the image file and the attribute data may judge the surface (front or back) and sheet number of each page image in the image file by interpreting the attribute data. Consequently, it becomes possible to control the print operation, for example, in a manner in which first two pages of the image file are printed by double-sided printing on the front surface and the back surface of the first sheet, respectively, and in which the third page is printed on the front surface of the second sheet, the fourth page is printed on the front surface of the third sheet, and so on. Thereby, the print result may have the same page arrangement as that of the originals shown in FIG. 3. When a document whose page arrangement is important is scanned to be saved, a page arrangement may be reproduced at the time of reprinting.

In addition, if a conventional apparatus that does not associate the attribute of each page with image data simply performs double-sided printing of the six pages of the images acquired by the scanning of the originals, the images are printed on three sheets as shown in FIG. 5, and consequently the page arrangement of the originals cannot be reproduced. Moreover, if the conventional apparatus performs single-sided printing of the images, the result brings a different page arrangement from that of the originals.

Figure 6:
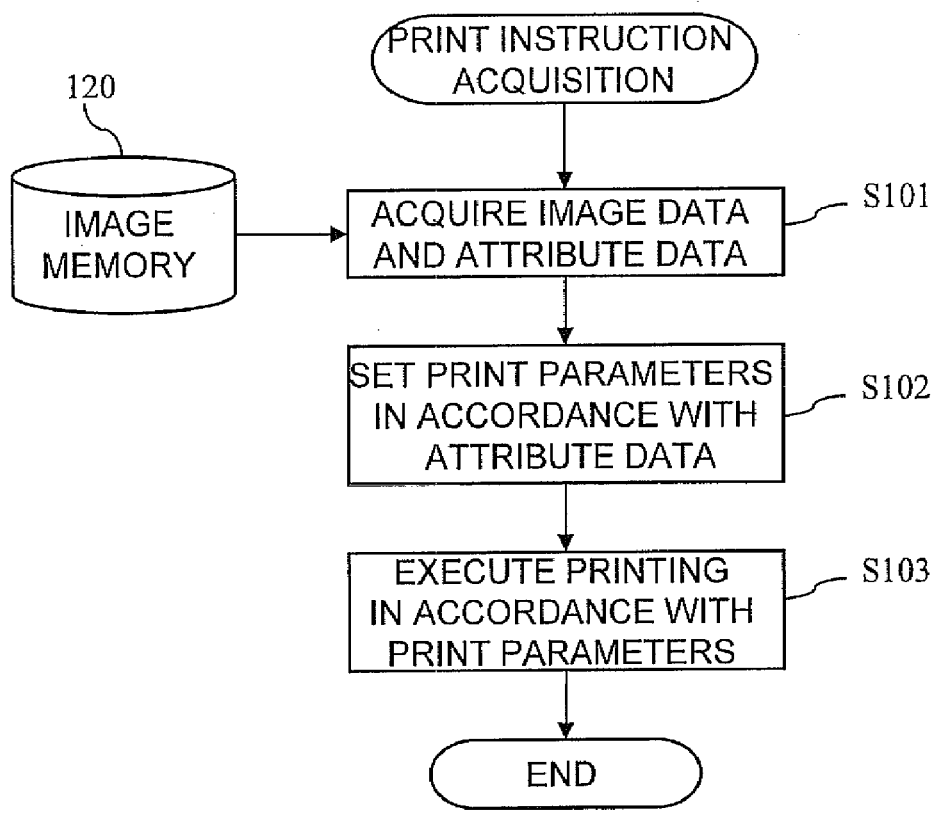
FIG. 6 is a flow chart showing an example operation of a printing apparatus using image data generated by the multifunction device of the exemplary embodiment and attribute data.

By reference to FIG. 6, a description is given of an example processing procedure of a printing apparatus (a multifunction device or a digital copier may also be used) that receives and prints the image data and the attribute data that have been output by the multifunction device 100 in the state of being associated with each other.

In this example, the printing apparatus acquires the image data to be printed and the attribute data (job ticket) corresponding to the image data in accordance with a print instruction of a user (Step S101). Hereupon, for example, a user may access the image memory 120 to acquire the image data that the user desires to print and the attribute data corresponding to the image data, and may deliver the acquired image data and the attribute data to the printing apparatus to instruct printing. Moreover, the user may perform a print instruction by transmitting the uniform resource locator (URL) of the image data that the user desires to print or the attribute data thereof in the image memory 120, and the printing apparatus may download the pair consisting of the image data and the attribute data in response to the instruction. Moreover, when a user has image data or attribute data (e.g. a job ticket), the user may send the data to the printing apparatus to perform a print instruction, and in response to the print instruction the printing apparatus may access the image memory 120 to download the attribute data or the image data, respectively, which corresponds to the sent data.

Next, the printing apparatus interprets the attribute data (e.g. a job ticket) to set print parameters (print attributes) at the time of printing the image data (Step S102). Because the attribute data are the data that the printing apparatus can interpret, such parameter setting can be performed. In the case of the example mentioned above, the printing apparatus sets the parameters such as enabling the printing apparatus to perform printing of the first and the second pages of the image on the front and the back surfaces of the first sheet, respectively, printing of the third page of the image on the front surface of the second sheet, and printing of the fourth page of the image on the front surface of the third sheet.

Then, the printing apparatus prints each page of the image data on the sheets by operating in accordance with the set print parameters (Step S103).

Figure 7:
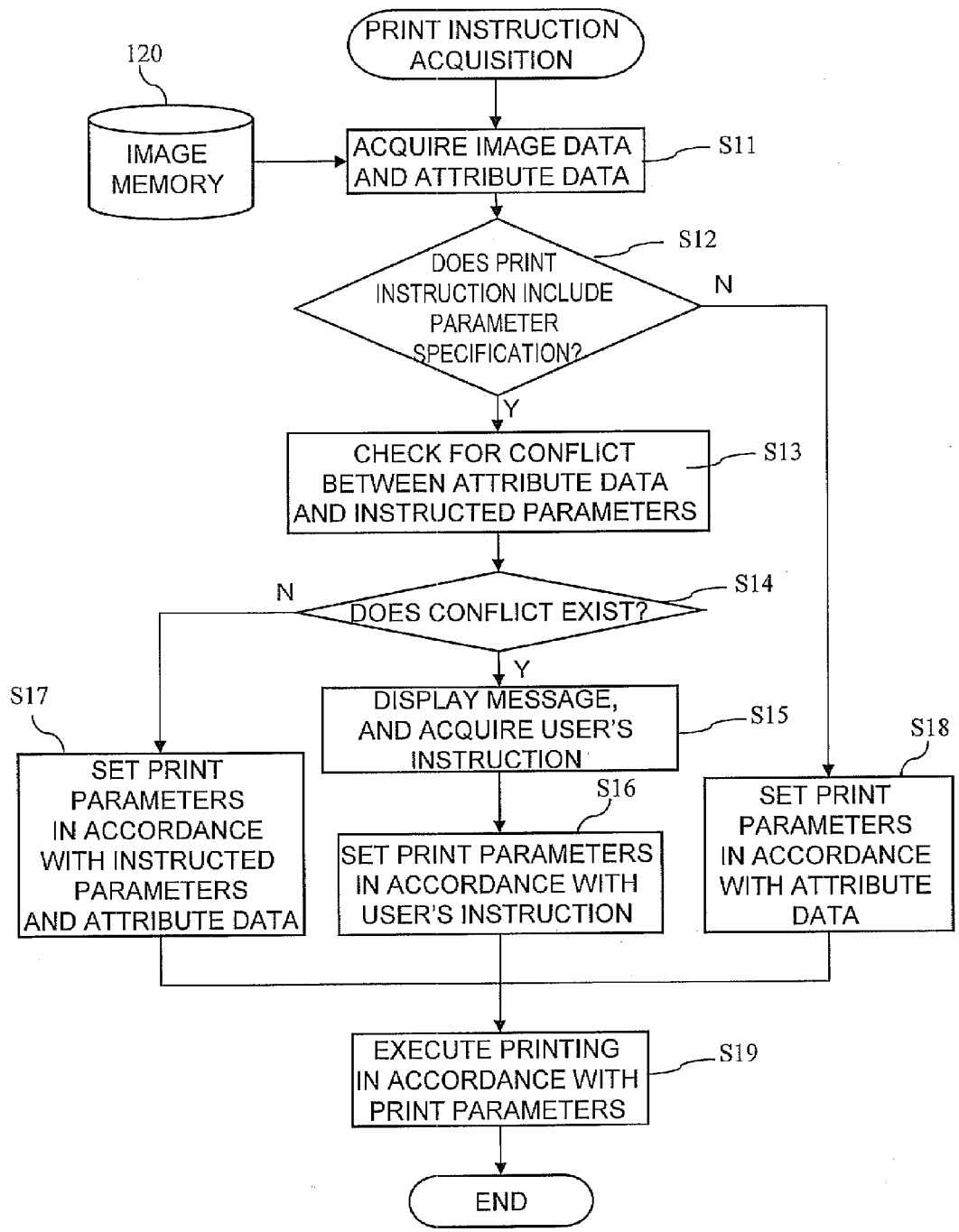
FIG. 7 is a flow chart showing another example of the operation of the printing apparatus using the image data and the attribute data.

The example mentioned above is that of the case where the print parameters are automatically set in accordance with the attribute data to print the image data. As another example, with reference to FIG. 7 there is described a processing procedure in the case where a user may specify print parameters of image data to the printing apparatus.

In this example, there is a case where an instruction from a user includes the specification of print parameters (attributes). When the printing apparatus that has received the instruction acquires the image data to be printed and the attribute data thereof from the image memory 120 (Step S11), the printing apparatus judges whether or not the specification of the print parameters that the user (person instructing printing) has specified is included in the print instruction (Step S12). When the specification is not included, the printing apparatus interprets the attribute data to set print parameters (Step S18). When the specification is included, the printing apparatus judges whether or not the items have a conflict between the print parameters specified by the person instructing printing and the print parameters indicated by the attribute data (Steps S13 and S14). When no parameter items have a conflict, the printing apparatus sets as the print parameters the values of the parameter items that the person instructing printing has specified and the parameter items indicated by the attribute data (Step S17). When the parameter items have a conflict, the printing apparatus inquires the person instructing printing whether to select the value specified by the person instructing printing or the value indicated by the attribute data (Step S15). In this inquiry, for example, a message indicating that the image data instructed to be printed include attribute data is displayed on the user interface screen of the printing apparatus (the message is transmitted to a personal computer (hereinafter referred to as PC) in the case of a print instruction with the remote PC), and the person instructing printing is inquired of which one to select. The printing apparatus determines the print parameters by adopting the value selected by the person instructing printing for conflicting parameter items and adopting both the values of the user specification and the attribute data for non-conflicting items (Step S16).

When the print parameters have been determined in the manner mentioned above, the printing apparatus prints the image data in accordance with the print parameters.

Figure 8:
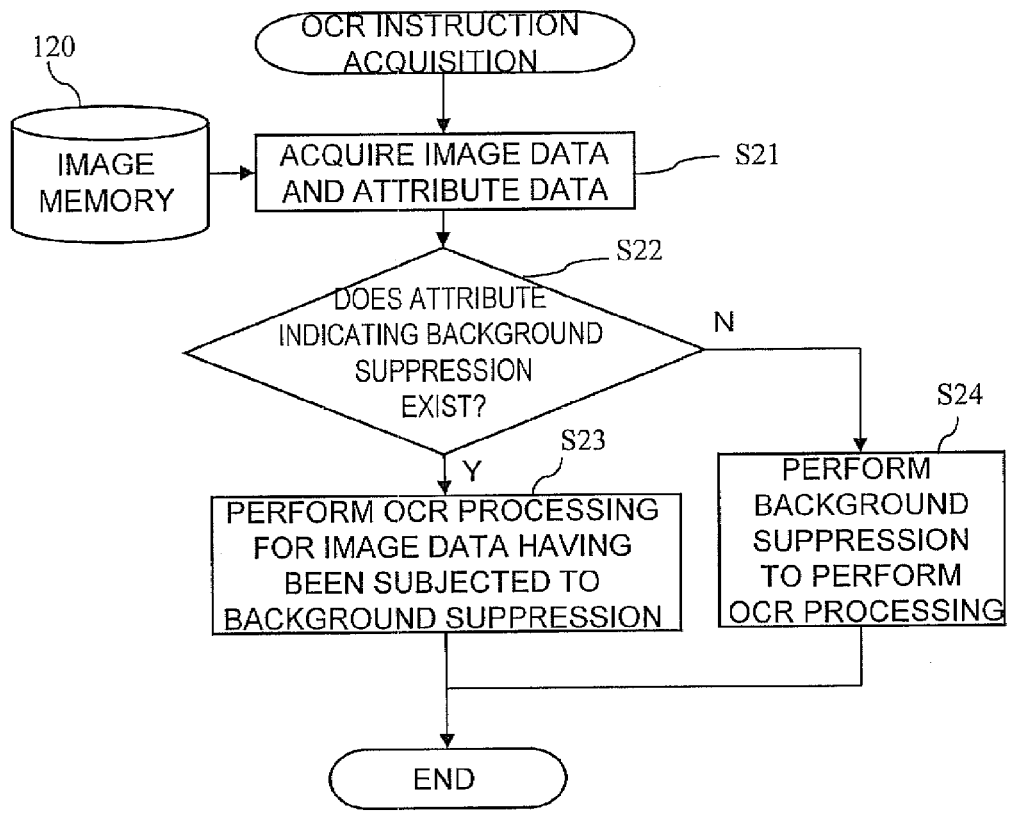
FIG. 8 is a flow chart showing a processing procedure executed at the time of using the attribute data in OCR processing.

Next, an example of applying the attribute data to OCR processing is described with reference to FIG. 8. The procedure of FIG. 8 is executed by an OCR program installed in a PC, a workstation, or a server.

In the procedure, the OCR program first acquires from the memory 120 the image data being a target of OCR processing that has been instructed by a user and the attribute data corresponding to the image data (Step S21). Next, the OCR program examines the attribute data to judge whether or not the attribute data include a background suppression attribute item that indicates that the image data have been subjected to background suppression (Step S22). When a attribute item that indicates that the image data have been subjected to the background suppression exist, the OCR program performs OCR processing on the image data in consideration of the background suppression (Step S23). In contrast, when the background suppression attribute indicates no background suppression, the OCR program performs the background suppression on the image data, and subjects the result of the background suppression to OCR processing (Step S24).

According to the processing procedure, suitable OCR processing may be performed in accordance with whether or not the image data have been subjected to background suppression.

The image reader unit 102 and an image-processing unit (not shown) that is provided at the subsequent stage of the image reader unit 102 sometimes perform the processing for various image adjustments such as show-through effect correction (the processing of removing the image on the back surface side that thinly appears on the front surface side from an image read from a duplex original) in addition to OCR processing. Consequently, if the information pertaining to whether or not such various kinds of image adjustment processing have been performed is incorporated into the attribute data, the OCR program may grasp the contents of the image processing of the image data having already been received at the time of performing subjecting the image data to OCR processing. Consequently, the OCR program may perform OCR processing suitable to the image quality of the image data.

Moreover, although in the above description OCR processing has been exemplified as the processing performed on image data, in addition to OCR processing, there is also known processing which can be expected to improve efficiency and accuracy when the contents of the image data have already been received, and the system of the present exemplary embodiment can be applied to such various kinds of processing.

The above description has addressed the methods of using the attributes pertaining to the number of the sheet and whether a page image is the front surface or the back surface of the sheet, and the attribute pertaining to the existence of background suppression. However, other attributes can be also used for the processing of image data.

For example, the original size may be obtained as the user-specified attribute or the original attribute, but if the original size is included in attribute data, printing on a sheet having the same size as that of the original maybe performed at the time of printing.

Moreover, if the color mode (concerning whether the original is colored, black and white, or grayscale) is incorporated in attribute data, image data may be printed in accordance with the color mode, or suitable image processing (for example, compression processing and the like) may be performed in accordance with the color mode.

Moreover, some multifunction devices 100 enable a user to specify the duplex mode of originals in double-sided scanning. The duplex mode is an attribute indicating the reading method of double-sided originals concerning whether the originals are opened in the vertical direction or in the horizontal direction. The cases of opening in the vertical direction and opening in the horizontal direction differ in relative directional relations of the images on the front surfaces and the back surfaces of the originals. In the case of receiving the specification of the duplex mode, the multifunction device 100 makes the read images on the respective surfaces face the same direction by vertically inverting the image on the back surface as the need arises according to the duplex mode. By associating the attribute data of the duplex mode with the image data generated in such a way, the image of a page may be printed with the image being rotated in order to be the same direction as that of the original as the need arises when the printing apparatus reprints the image data.

Moreover, by associating with image data the attribute indicating whether the scanning mode is double-sided scanning or single-sided scanning, the printing apparatus may perform double-sided printing of the image of each page in the case of double-sided scanning, and may perform single-sided printing in the case of single-sided scanning.

Moreover, by associating the scanning resolution specified by a user with image data as attribute data, the printing apparatus may perform printing with the print resolution or a half-tone screen that is suitable to the scanning resolution at the time of printing the image data. For example, when the print resolution is in a predetermined relation with the scanning resolution; for example, when the print resolution is an integral multiple of the scanning resolution, the image is at high risk of deterioration in image quality such as moiré. Accordingly, by selecting the print resolution that is not in such a relation with the scanning resolution, deterioration of the image quality at the time of printing may be suppressed. Also in the case of the half-tone screen, because the image is at high risk of deterioration in image quality such as the moiré for some relations between the numbers of lines and the scanning resolution, the printing apparatus selects the screen that is not in such a relation with the scanning resolution.

Moreover, by associating the sharpness value (the sharpness of the edge of an image) that a user has specified with image data as attribute data, the printing apparatus may perform printing after having performed image processing suitable to the sharpness value at the time of printing or processing the image data. When an image-processing apparatus or software performs the image processing on image data, processing according to the sharpness value may be also performed.

Although the above description addresses examples of applying the method of the exemplary embodiment to a multifunction device have been described, a person skilled in the art would be able to easily understand that the method of the exemplary embodiment can be applied to the entire image reading apparatus such as a scanner. Moreover, the method of the present exemplary embodiment can be also installed into a combination of a scanner and a PC or a workstation that controls the scanner. In this case, the scanner corresponds to the image reader unit 102 in the configuration of FIG. 1, and the other elements correspond to the software on the PC.

The system is realized by executing the program describing the function and the processing contents of each of the aforesaid units other than the image reader unit 102 by, for example, a general purpose computer. The computer includes a circuit configuration composed of, for example, a central processing unit (CPU), memory (primary storage), various input/output (I/O) interfaces, and the like, that are connected with one another via a bus as the hardware thereof. Moreover, for example, a hard disk drive is connected to the bus via an I/O interface, or a disk drive for reading a portable nonvolatile recording medium of various standards such as a CD, a DVD, or a flash memory is connected to the bus. A program describing the processing contents of the exemplary embodiment is saved in a secondary storage such as a hard disk drive via a recording medium such as a CD or a DVD, or via a network, and is installed in the computer. The processing of the exemplary embodiment is realized by reading into a memory the program stored in the secondary storage and executing the read program with the CPU.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with various modifications as are suited to the particular use contemplated. It is intended that the scope of the invention be defined by the following claims and their equivalents.

What is claimed is:

1. An image reader system comprising:
an attribute acquisition unit that acquires an attribute of each page of an original that has been detected by an image reader unit that optically reads an image of the original, the attribute of each page of the original being a classification of each page of the original;
an image output unit that outputs the attribute that has been acquired by the image reader unit and image data that are acquired by the reading of the image reader unit with the attribute and the image data being associated with each other; and
a print unit to receive the outputted attribute and associated image data;
said print unit determining if the received attribute and associated image data conflict with received print parameters;
said print unit acquiring user instructions when said print unit determines that the received attribute and associated image data conflict with received print parameters;
said print unit setting print parameters in accordance with acquired user instructions;
said print unit printing the received image data in accordance with the set print parameters.

2. An image reader system comprising:
a read attribute determination unit that determines a read attribute of each page of an original, the read attribute of each page of the original being a classification of each page of the original;
a scanning control unit that controls an image reader unit to scan the original in accordance with the determined read attribute and acquires an image acquired as a result of the scanning to thereby generate image data; and
an image output unit that associates the specified read attribute with the image data and outputs the associated read attribute and the image data; and
a print unit to receive the outputted read attribute and associated image data;
said print unit determining if the received read attribute and associated image data conflict with received print parameters;
said print unit acquiring user instructions when said print unit determines that the received read attribute and associated image data conflict with received print parameters;
said print unit setting print parameters in accordance with acquired user instructions;
said print unit printing the received image data in accordance with the set print parameters.

3. An image reader control method comprising:
causing an image reader unit optically read an image of an original;
acquiring an attribute of each page of the original detected by the image reader unit, the acquired attribute of each page of the original being a classification of each page of the original;
associating the acquired attribute with image data acquired by reading to thereby output the associated attribute and the image data;
receiving, at a printing device, the outputted attribute and associated image data;
determining if the received attribute and associated image data conflict with received print parameters;

acquiring user instructions when it is determined that the received attribute and associated image data conflict with received print parameters;

setting print parameters in accordance with acquired user instructions; and printing the received image data in accordance with the set print parameters.

4. An image reader control method comprising:

determining a read attribute of each page of an original, the read attribute of each page of the original being a classification of each page of the original;

causing an image reader unit scan the original in accordance with the determined read attribute;

acquiring an image acquired as a result of the scanning to thereby generate image data; and associating the specified read attribute with the image data to thereby output the associated read attribute and the image data;

receiving, at a printing device, the outputted read attribute and associated image data;

determining if the received read attribute and associated image data conflict with received print parameters;

acquiring user instructions when it is determined that the received read attribute and associated image data conflict with received print parameters;

setting print parameters in accordance with acquired user instructions; and printing the received image data in accordance with the set print parameters.

5. An computer-readable medium storing a program causing a computer to execute a process for providing content, the process comprising:

causing an image reader unit optically read an image of an original;

acquiring an attribute of each page of the original detected by the image reader unit, the acquired attribute of each page of the original being a classification of each page of the original; and associating the acquired attribute with image data acquired by reading to thereby output the associated attribute and the image data;

receiving, at a printing device, the outputted attribute and associated image data;

determining if the received attribute and associated image data conflict with received print parameters;

acquiring user instructions when it is determined that the received attribute and associated image data conflict with received print parameters;

setting print parameters in accordance with acquired user instructions; and printing the received image data in accordance with the set print parameters.

6. An computer-readable medium storing a program causing a computer to execute a process for providing content, the process comprising:

determining a read attribute of each page of an original, the read attribute of each page of the original being a classification of each page of the original;

causing an image reader unit scan the original in accordance with the determined read attribute;

acquiring an image acquired as a result of the scanning to thereby generate image data; and associating the specified read attribute with the image data to thereby output the associated read attribute and the image data;

receiving, at a printing device, the outputted read attribute and associated image data;

determining if the received read attribute and associated image data conflict with received print parameters;

acquiring user instructions when it is determined that the received read attribute and associated image data conflict with received print parameters;

setting print parameters in accordance with acquired user instructions; and printing the received image data in accordance with the set print parameters.

* * * * *